US007743976B2

(12) United States Patent
Knepple et al.

(10) Patent No.: US 7,743,976 B2
(45) Date of Patent: *Jun. 29, 2010

(54) METHOD FOR LABELING SAMPLE CONTAINERS

(75) Inventors: Ronny Knepple, Uberlingen (DE); Hubert Riegger, Salem (DE)

(73) Assignee: PerkinElmer Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 11/040,536

(22) Filed: Jan. 21, 2005

(65) Prior Publication Data

US 2005/0214463 A1 Sep. 29, 2005

Related U.S. Application Data

(63) Continuation-in-part of application No. 09/403,072, filed as application No. PCT/EP99/00943 on Feb. 12, 1999, now Pat. No. 6,899,267.

(30) Foreign Application Priority Data

Feb. 13, 1998 (DE) ................................ 198 06 049

(51) Int. Cl.
*G06K 7/10* (2006.01)
*G06F 7/00* (2006.01)

(52) U.S. Cl. ................................. 235/376; 235/462.01

(58) Field of Classification Search ................. 235/376, 235/462.01, 462.03, 454, 494, 462.08, 462.02, 235/375; 65/158; 219/121; 156/219, 209, 156/220, 553, 84–86; 106/31
See application file for complete search history.

(56) References Cited

U.S. PATENT DOCUMENTS 3,745,314 A 7/1973 Mathias et al.
3,767,496 A * 10/1973 Amberg et al. ................ 156/86
4,230,266 A 10/1980 Juvinall
4,270,863 A 6/1981 Trogdon
4,323,755 A * 4/1982 Nierenberg ............ 219/121.69
4,476,381 A 10/1984 Rubin
4,691,830 A 9/1987 Ahl et al.
4,705,551 A * 11/1987 Robinson, Jr. ............... 65/60.1

(Continued)

FOREIGN PATENT DOCUMENTS

DE 32 42 489 A1 5/1984

(Continued)

*Primary Examiner*—Thien M. Le
*Assistant Examiner*—Thien T Mai
(74) *Attorney, Agent, or Firm*—St. Onge Steward Johnston & Reens LLC

(57) ABSTRACT

A method of providing sample containers with an automatically readable identification for an analysis device, in which the sample container may be heated to an operating temperature for analysis. It is the object of the invention to improve the identification of sample containers in a manner that the sample contained in the sample container is not contaminated by the constituents of the identification agent during analysis. The object of the invention is solved in that the identification is applied at an elevated temperature above the operating temperature. By the method according to the invention, volatile constituents of the identification agent are advantageous evaporated so that when using the sample container during operating temperature of the analysis device, the sample to be analyzed is no longer contaminated by the exhaling constituents of the identification agent.

14 Claims, 4 Drawing Sheets

U.S. PATENT DOCUMENTS

| | | | | | |
|---|---|---|---|---|---|
| 5,206,496 | A | * | 4/1993 | Clement et al. | 250/271 |
| 5,407,474 | A | * | 4/1995 | Airey et al. | 106/31.05 |
| 5,441,561 | A | * | 8/1995 | Chujo et al. | 106/31.28 |
| 5,458,714 | A | | 10/1995 | Brandt et al. | |
| 5,507,388 | A | | 4/1996 | Kildal et al. | |
| 5,670,118 | A | | 9/1997 | Sponholtz | |
| 5,939,468 | A | * | 8/1999 | Siddiqui | 523/161 |
| 6,096,408 | A | * | 8/2000 | Laprade et al. | 428/32.77 |
| 6,140,291 | A | * | 10/2000 | Bolkan et al. | 510/245 |
| 6,165,594 | A | * | 12/2000 | Moh et al. | 428/207 |
| 6,277,228 | B1 | * | 8/2001 | Fabrikant et al. | 156/219 |
| 6,899,267 | B2 | * | 5/2005 | Knepple et al. | 235/376 |

FOREIGN PATENT DOCUMENTS

| | | | | |
|---|---|---|---|---|
| DE | 37 32 245 | A1 | | 4/1988 |
| EP | 0 088 914 | | | 9/1983 |
| EP | 88914 | A | * | 9/1983 |
| EP | 0 398 717 | | | 11/1990 |
| JP | 05-000821 | A | | 1/1993 |
| JP | 05000821 | A | * | 1/1993 |
| JP | 05017712 | A | * | 1/1993 |
| JP | 08053121 | A | * | 2/1996 |

* cited by examiner

METHOD FOR LABELING SAMPLE CONTAINERS

RELATED APPLICATION

This patent application is a continuation-in-part application of U.S. patent application Ser. No. 09/403,072 filed Jan. 19, 2000 now U.S. Pat. No. 6,899,267 which claims the benefit of International Patent Application No. PCT/EP99/00943 filed Feb. 12, 1999 and claiming foreign priority of German Patent Application No. DE 198 06 049.1, filed Feb. 13, 1998.

FIELD OF THE INVENTION

The present invention refers to a method for labeling sample containers, and more particularly, to a method for labeling sample containers for an analysis device, in which the sample containers can be heated to a temperature, having an automatically readable identification.

BACKGROUND OF THE INVENTION

The labeling or identification of sample containers serves, for instance, for clearly identifying the sample to be analyzed so that the analysis results can be clearly allocated to the sample and incorrect allocations are avoided, in particular when a plurality of similar sample containers are used. A plurality of methods of labeling or identifying samples are known, which are used in accordance with the application purpose of the sample container.

In the simplest case, the sample container is marked by hand, for instance by a felt pen (e.g. a waterproof pen). If analysis devices having a read unit for automatically reading sample identifications are used, the hand-written identification can generally not be automatically read by the read unit. A measuring protocol provided with an identification therefore usually requires the manual input of the identification into an input unit of the analysis device. This requires more work with the risk of incorrect allocation when the identification is incorrectly input.

A further possible allocation of the sample container may for instance be performed indirectly through a position number of the sample container in a magazine. This disadvantage is that a clear identification of the sample container is not detected automatically and therefore a manual allocation of the sample container and the position number is required. Incorrect allocations between the sample (sample container) and the position number may occur, in particular when a plurality of magazine charges are to be analyzed.

In analysis devices having a read unit for reading sample container identifications, as e.g. a bar code, a clear allocation of the sample container identification and the analysis results is performed as schematically shown in FIG. 1.

The sample container 1 is provided by the user with a machine-readable code 2, which is for instance printed onto an identification label. The identification may for instance be generated by means of a computer 3 by a printer (encoding means) 4 and may be adhered onto the sample container 1. The sample container 1 is identified (decoded) in the analysis device 5, wherein the identification along with the measuring results is handed back to the computer. As an alternative to the adhesive label, the identification can also be printed directly onto the sample container, wherein, however, each user requires a special identification unit (encoding means 4) instead of a conventional printer, which allows the marking of sample containers. An identification unit of that kind usually causes clearly higher costs of purchase and can be used for a specific purpose only. When using adhesive labels, disadvantages may result with respect to the constructional tolerances of the sample containers, since the adhesive label changes the dimensions of the sample container which is provided with a label. In the head space gas-chromatography. the sample container is heated up to a temperature of approximately 300° C., wherein the thermostatization of the sample container is performed in a small opening with very narrow tolerances within a heating block. Thus, an identification by adhesive labels cannot be performed. Furthermore, the adhesives of the adhesive labels have a temperature stability insufficient for this application. The attachment of the identification by hand is also often not practicable, since in case of precision measurements the sample containers should not be touched after a cleaning process in order to avoid impurification and therefore a falsification of the analysis results.

A further decisive disadvantage of the methods described so far is that constituents of the identification ink or constituents of the adhesive of the adhesive label or of the label contaminate the substance analyzed during measurement, in particular when the sample containers and samples are severely heated as in head space gas-chromatography (e.g. to 300° C.).

SUMMARY OF THE INVENTION

It is the object of the present invention to eliminate the above-mentioned disadvantages and to provide an improved method of identifying sample containers.

According to one aspect of the invention, this object is solved in that during the manufacturing process of the sample container, the identification (i.e., labeling by application of a marking agent) is applied during the final cooling phase of the ready sample container in a temperature interval between a maximum temperature during sample container manufacture and the operating temperature of the sample container in the analysis device.

The method according to the invention leads to significant advantages for the user, since the application of the identification (e.g. an encoding) on the sample container becomes superfluous, which saves for instance the use of identification units. Thus, the costs of the analysis process are generally lowered, since the number of working steps for the analysis and possible sources of error during sample identification are reduced.

Since the identification during a temperature interval between a maximum temperature occurring during the sample manufacture and the operating temperature of the sample container is performed in the analysis device, the advantage results that the marking agents (e.g. ink) during identification of the sample container are heated to a temperature higher than the operating temperature, wherein the volatile constituents of the marking agent evaporate already during the manufacturing process and the identification does not contaminate the sample by de-gassing constituents during the analysis process due to this heating. This is in particular significant in the application of sample containers in the head space gas-chromatography since the identification together with the sample container is exposed to high temperatures, wherein the sensitivity of this analysis method is very high so that even the slightest impurification of the sample by the identification agent would be harmful. In addition, the sample containers do not need to be touched after a possible cleaning procedure in order to apply an identification, thus further reducing the risk of an impurification of the sample container and therefore a contamination of the samples.

The increased temperature of the sample container when applying the identification advantageously results in an “abrasion-resistant” identification, since the marking agent burns into the surface of the sample container, which may for instance consist of glass, and therefore better adheres to the surface of the sample container. Thus, the marking agent may more favorably bond with the surface of the sample container, wherein the connection may be performed both chemically and physically (e.g. by means of adsorption, fusion or diffusion).

Since the identification is applied during the final cooling phase of the sample container manufacture, the additional advantage results that the sample container must not be heated for applying the identification in order to include the above-described advantages of such an identification. This significantly reduces the costs of the identification method due to the reduced number of method steps and due to the saving of energy.

Since the identification is already performed at the manufacturer side, the possibility advantageously results to attach the identification in the form of continual series numbers (encoded and/or not encoded) so that the sample containers can be clearly identified worldwide. Additionally, there is the advantageous possibility of including information into the identification, such as the manufacturing date of the sample container, the materials used, the purpose, size, etc.

According to another aspect of the invention, the above identified object is solved in that, labeling with a marking agent is applied after obtaining a sample container already produced and after elevating the temperature of the sample container to an elevated temperature which is above an operating temperature of the sample. According to still another aspect of the invention, this object is solved in that, labeling with a marking agent is applied after obtaining a sample container already produced, however, before elevating the temperature of the sample container to an elevated temperature which is above an operating temperature of the sample. These methods are typically not applicable during the manufacturing process of the sample container, but are to be generally performed using a sample container already manufactured. These methods also provide most of the advantages described above.

The identification or labeling is preferably applied at temperatures between 300° C. and 600° C., which is why the sample containers identified in this manner are especially suitable for the head space gas-chromatography in which the sample containers are heated to up to 300° C. This ensures, as described above, that the marking agents do not contaminate the sample in the sample container during the analysis, e.g. by de-gassing.

The identification of the sample container is preferably applied by means of an ink jet printing method of the known ink jet printing technology, in which the single-colored or multi-colored identification is printed onto a surface of the sample container by means of appropriate inks.

Furthermore, special inks can also be used which reveal the identification only by UV illumination, wherein the fluorescent wavelength area of the ink may for instance be adapted to the spectral sensitivity of the read device. The application of the identification by means of the ink jet printing method has the advantage, besides the above-mentioned advantages, that the dimensional accuracy is not influenced by the identification. Thus, sample containers identified in this manner also fulfill the geometric tolerance demands for the use in head space gas chromatographs. An additional advantage of the ink jet print technology results from the contact-less application of the identification, by which the sample containers do not need to be further treated before and after the identification process.

The identification is preferably applied in the form of a bar code, e.g. annularly, onto a cylindrical portion of the sample container. If the code is arranged in a manner that it is readable along the cylindrical axis, this code can reliably be read irrespective of the position angle of the sample container by a read device arranged perpendicular to the cylindrical axis. The code may, however, also be arranged at any other different angle to the cylindrical axis.

The identification of the sample container advantageously comprises besides a code (e.g. a bar code) also numerals and texts, which may correspond to the encoded information of the identification. Thereby, the identification can advantageously be read also without the decoded read means, and enables a direct control by the operating personnel of the analysis device.

The read device for reading the identification of the sample container may consist of a decoder device, e.g. a device for reading a bar code, it may, however, also comprise different image and pattern detection devices and methods. The identification may for instance be detected by scanners or video cameras and may be processed in a computer by means of pattern detection algorithms. By the application of such image or pattern detection methods, the encoding of the identification can be renounced and the identification can be applied directly onto the sample container in the form of numerals and/or letters. Furthermore, symbols (e.g. a company logo) can be applied together with the identification by the method according to the invention.

BRIEF DESCRIPTION OF THE DRAWINGS

The invention shall now be described by means of an embodiment and the enclosed drawings.

DETAILED DESCRIPTION OF THE DRAWINGS

Figure 1:
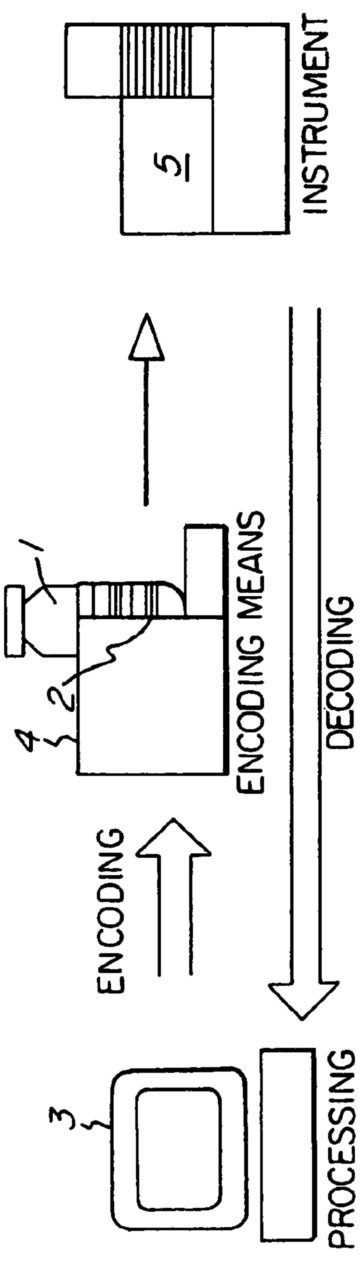
FIG. 1 (PRIOR ART)
FIG. 1 is a known identification method for sample containers.
Figure 2:
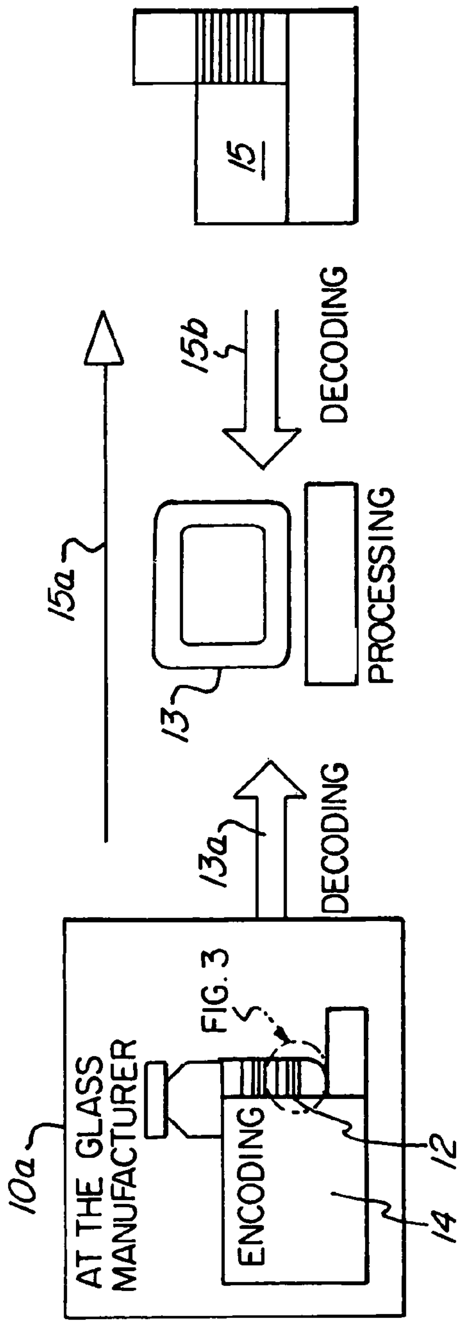
FIG. 2 is an example of an identification method according to the invention with an application for the sample identification in an analysis device.

FIG. 1 shows, as described above, a known identification device for sample containers. FIG. 2 shows an example of an identification method according to the invention. The sample containers 10 (in the special example consisting of glass) are provided with an identification 12 already when producing the sample container (manufacture of glass) 10*a*. The sample container 10 may generally also consist of plastics, ceramics or metal. In the example shown, a bar code 12 is annularly applied by means of an encoding device 14 onto the glass sample container 10 around its cylindrical portion during its final cooling phase so that this code is readable along the cylindrical axis. Such an identification or labeling of the sample container 10 can alternatively be performed with the sample container which is already manufactured. Methods of such identification will be described later in connection with FIGS. 4-6.

The bar code 12 is for instance sprayed onto the container by ink in a contact-less manner via an ink jet printer. The identification can, however, also be applied by means of mechanical action, e.g. by scratching or grinding, or for instance by means of laser beams or by vapor deposition. The optical properties of the sample container 10, such as the refractive index or the reflective ability as well as the material thickness of the sample material envelope may be manipulated by the identification process in order to indicate the information content of the identification.

The user of the sample container may read and decode 13*a* the identification by means of a read unit, as for instance a scanner, and provide the information of the identification in a computer 13 and for instance assign it to an application-specific identification. Then (see arrow 15*a*), the identified sample container 10 with the sample reaches the analysis device 15, in which the sample is analyzed. During the analysis, the identified sample container 10 is also identified by a read unit by means of its identification and the analysis date is transmitted (15*b*) along with the identification to the computer 13. In the computer 13 the measured data can then be further processed in consideration of the identification. The encoding of glass sample containers for the head space gas-chromatography basically consists of a compact (maximum of 30 mm long) annular code (e.g. 2 from 5) which can be measured in the axial direction of the sample container, wherein for instance black ink is sprayed onto a deadened glass surface of the sample container. As an alternative, the code can also be applied by a plurality of colors, for instance by alternately spraying black and white ink onto the glass surface of the sample container by the aid of the ink jet printing method. The temperature of the sample container is preferably approximately 500° C. during the identification. The above-described annular bar code is advantageously annularly readable by means of a scanner or read unit, irrespective of the position of the sample container to the read unit. As an alternative to the contact-less optical reading of the identification, this identification, when applied correctly, can also be read by mechanical scanning by means of read pens or it may be performed by the determination of the dielectric or magnetic properties of the identification of the sample container. In the embodiment shown, a preferably eight or nine-digit numeric bar code is used by which approximately hundred million or a billion of different identifications result. By this numeric code, the sample containers can be clearly identified worldwide at continual numeration.

Figure 3:
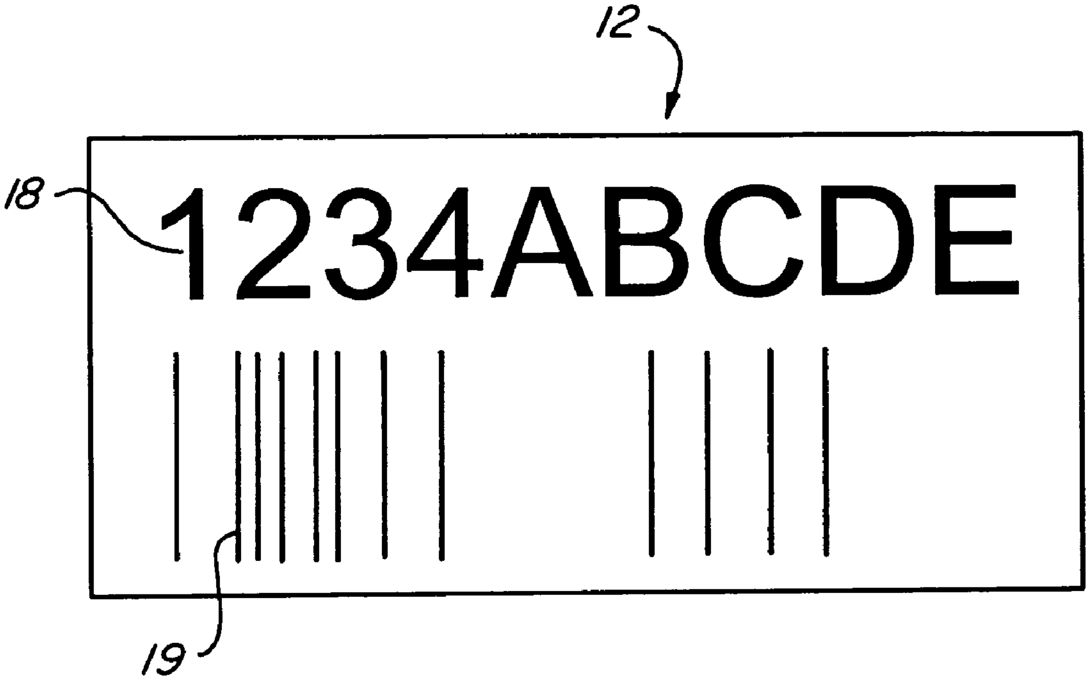
FIG. 3 is an example of identification applied according to the invention.

FIG. 3 more particularly depicts bar code 12, which was referenced in FIG. 2, to include a numeral 18, electronic information 19, or combinations of these. All that is required is for bar code 12 to impart readable information of any sort, whether readable by a user or a computer or both.

Figure 4:
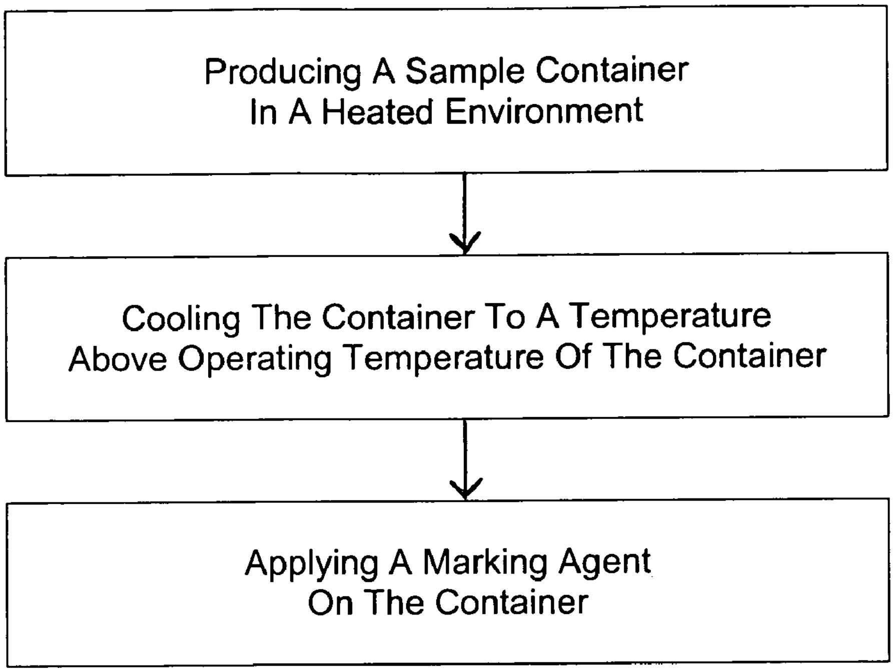
FIG. 4 is a flow chart illustrating an identification or labeling method in accordance with one embodiment of the invention.

FIG. 4 summarizes one exemplary method of the labeling of the sample container, in which the labeling by application of making agents is performed during the manufacturing process of the sample container as discussed above.

Figure 5:
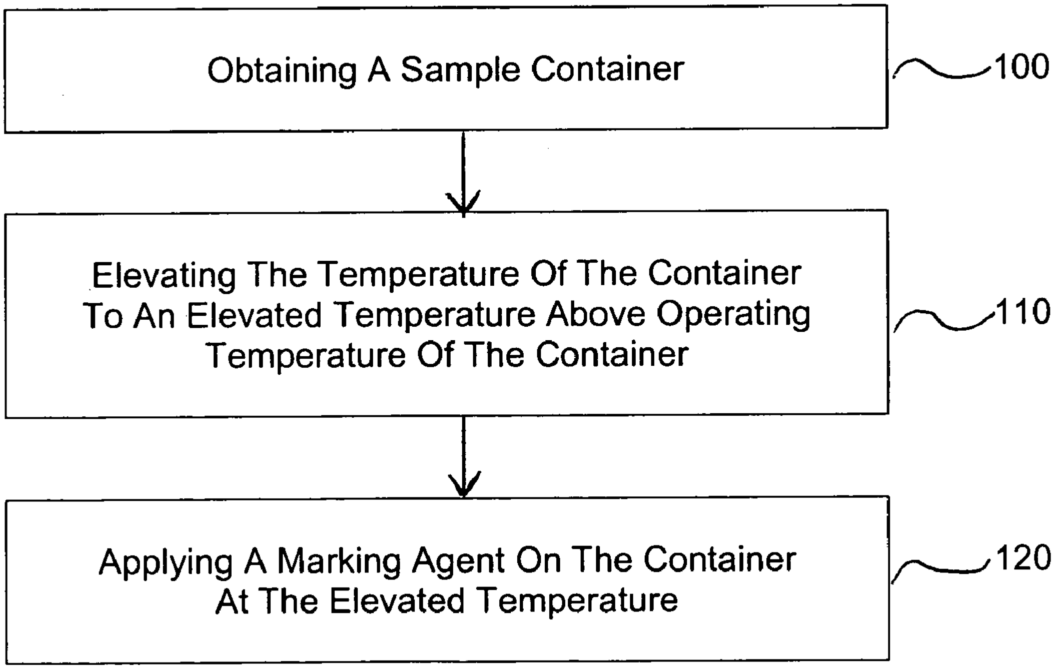
FIG. 5 is a flow chart illustrating an identification or labeling method in accordance with another embodiment of the invention.

With reference now to FIG. 5, one alternate labeling method of the invention is described herein further in details. This method is applicable preferably after obtaining a sample container (step 100) which is usable for holding a sample within the sample container. The obtained sample container is now subject to heat and temperature of the sample container is elevated to a temperature which is above the operating temperature of the sample container (e.g., a temperature for analyzing a sample to be received in the container) (step 110). Thereafter, a marking agent such as printable ink is applied at the elevated temperature for identification or providing information relevant to the sample on an external surface of the sample container (step 120). This causes evaporation of volatile constituents of the marking agent, and thus can prevent contamination of the object samples when the samples are received in the container and subject to heat to the operating temperature for a subsequent analytical procedure as discussed above.

Figure 6:
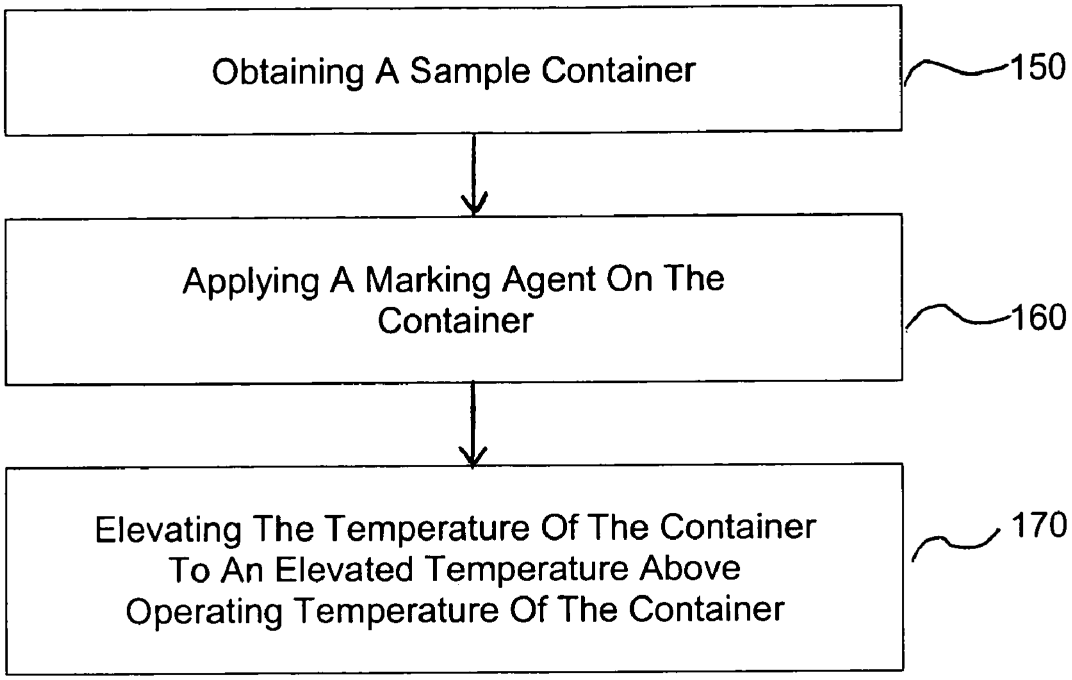
FIG. 6 is a flow chart illustrating an identification or labeling method in accordance with another embodiment of the invention.

With reference now to FIG. 6, another alternate labeling method of the invention is described herein further in details. Similar to the method described above in connection with FIG. 4, this method is also applicable preferably after obtaining a sample container (step 150) which is usable for holding a sample within the sample container. A marking agent such as printable ink is applied for identification or providing information relevant to the sample on an external surface of the sample container (step 160). The temperature for applying the marking agent at this time is preferably a room temperature. However, other temperature different than the room temperature can be applicable as long as it can properly apply the marking agent. Thereafter, the sample container is subject to heat, and temperature of the sample container is elevated (or temperature of the container is adjusted) to a temperature which is above the operating temperature of the sample container, that is, above the temperature for analyzing a sample to be received in the container (step 170). This causes evaporation of volatile constituents of the marking agent, and thus can prevent contamination of the samples when the samples are received in the container and subject to heat to the operating temperature for a subsequent analytical procedure as discussed above.

According to the methods described above with FIGS. 5 and 6, suitable information in form of symbols, bar codes, or letters can be applied for providing relevant information or identification of the sample, preferably with a printer such as an inkjet printer or other printers known in the art. Other features of the methods and advantages to be obtained from such methods are similar to those described above in association with FIGS. 1-4.

While this invention has been particularly shown and described with reference to preferred embodiments thereof, it will be understood by those skilled in the art that various changes and modifications in form and details may be made thereto without departing from the spirit and scope of the invention as defined by the appended claims.

What is claimed is:

1. A method for labeling a sample container for retaining a sample for analysis, the method comprising:

providing a sample container, the sample container being previously completely manufactured and being usable for holding a sample for analysis within the container at a sample analysis temperature higher than a room temperature;

elevating a temperature of the sample container to an elevated temperature above the sample analysis temperature of the sample container;

applying, after said elevating step, an ink having volatile constituents as a marking for providing information of the sample on a surface of the sample container; and evaporating volatile constituents of the marking agent as a result of the elevated temperature of the sample container and degassing these volatile constituents to prevent contamination of the sample to be received within the sample container.

2. The method as set forth in claim 1, wherein the step of applying the marking agent on the surface of the container comprises applying a bar code on the surface of the container.

3. The method as set forth in claim 1, wherein the step of applying the marking agent on the surface of the container comprises applying numerals or letters on the surface of the container.

4. The method as set forth in claim 1, wherein the step of applying the marking agent on the surface of the container comprises applying symbols on the surface of the container.

5. The method as set forth in claim 1, wherein the elevated temperature is between 300° C. and 600° C.

6. The method as set forth in claim 5, wherein the elevated temperature is approximately 500° C.

7. The method as set forth in claim 1 further comprising cooling the container after the step of applying the marking agent.

8. A method for labeling a sample container for retaining a sample for analysis, the method comprising:

providing a sample container, the sample container being previously completely manufactured and being usable for holding a sample for analysis within the container at a sample analysis temperature higher than a room temperature;

applying an ink having volatile constituents as a marking for providing information of the sample on a surface of the sample container;

elevating, before a sample is received within the sample container, a temperature of the sample container to an elevated temperature above the sample analysis temperature of the sample container; and evaporating volatile constituents of the marking agent as a result of the elevated temperature of the sample container and degassing these volatile constituents to prevent contamination of the sample to be received within the sample container.

9. The method as set forth in claim 8, wherein the step of applying the marking agent on the surface of the container comprises applying a bar code on the surface of the container.

10. The method as set forth in claim 8, wherein the step of applying the marking agent on the surface of the container comprises applying numerals or letters on the surface of the container.

11. The method as set forth in claim 8, wherein the step of applying the marking agent on the surface of the container comprises applying symbols on the surface of the container.

12. The method as set forth in claim 8, wherein the elevated temperature is between 300° C. and 600° C.

13. The method as set forth in claim 12, wherein the elevated temperature is approximately 500° C.

14. The method as set forth in claim 8 further comprising cooling the container after the marking agent is evaporated.

* * * * *